Jan. 6, 1970        D. K. KUEHL        3,488,152
BORON PRODUCTION
Filed March 16, 1966
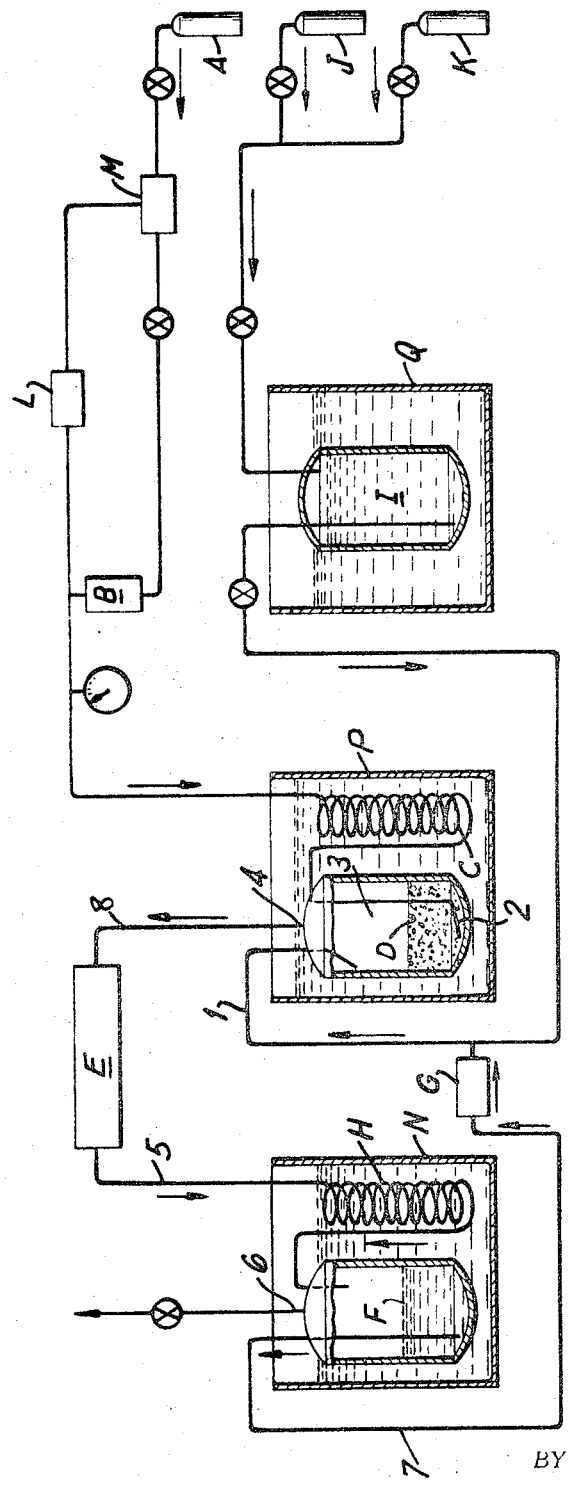
INVENTOR.
DONALD K. KUEHL
BY
Morgan, Finnegan, Durham & Pine
ATTORNEYS.

United States Patent Office 3,488,152
Patented Jan. 6, 1970

3,488,152
BORON PRODUCTION
Donald K. Kuehl, Manchester, Conn., assignor to United
Aircraft Corporation, East Hartford, Conn., a corporation of Delaware
Filed Mar. 16, 1966, Ser. No. 538,137
Int. Cl. C01b 35/00
U.S. Cl. 23—209                                   11 Claims

ABSTRACT OF THE DISCLOSURE

This invention pertains to a method of continuously producing boron from boron trichloride and hydrogen by passing hydrogen through boron trichloride maintained at a predetermined temperature, thereby controlling the amount of boron trichloride mixed with hydrogen.

This invention relates to a method of producing boron and, more particularly, to a method for producing boron from a boron trichloride starting material in a manner to minimize loss of boron trichloride and to facilitate control of reaction conditions.

The production of elemental boron by the reaction of boron trichloride and hydrogen has been known for many years. For example, in United States Patent No. 1,074,672, issued in 1913, the patentee, Weintraub, showed a method of passing liquid boron trichloride into a heated vessel where it was vaporized due to the application of heat increase and then carried along by a continuous flow of hydrogen gas to a reactor where boron was produced. At the conclusion of the reaction the mixture of gaseous reactants was cooled to condense out some unreacted boron trichloride. The difficulty with this technique was the discontinuous nature of the reaction because boron trichloride could only be passed to the heating chamber at intervals to insure its vaporization and to insure an adequate supply of hydrogen gas.

The method of this invention obviates difficulties inherent in the Weintraub process and permits continuous intermixing of boron trichloride vapor and hydrogen in a useful continuous process.

In the method of this invention, gaseous hydrogen is passed through a heating or cooling coil, controlled to a particular temperature, and the constant temperature hydrogen is then passed through a supply of liquid boron trichloride. The temperature at which boron trichloride is maintained and the temperature to which the hydrogen is heated or cooled, preferably the same, are both controlled so as to produce a particular boron trichloride vapor partial pressure above the liquid boron trichloride. The boron trichloride vapor thus produced, upon production, is immediately carried along by the stream of hydrogen gas passing through, diminishing the boron trichloride partial pressure and causing additional boron trichloride vaporization to occur to make up for the loss and to reestablish equilibrium. This goes on continuously and leads to uniform operating conditions.

The mixture of boron trichloride vapor and hydrogen is passed to a suitable reactor, with the reaction to produce boron taking place leaving a gaseous mixture consisting mainly of excess or unreacted boron trichloride and hydrogen and byproduct hydrogen chloride. This gaseous mixture is passed to a cooled recovery chamber where most of the boron trichloride is condensed and recycled back to the supply chamber. The hydrogen chloride and hydrogen not being condensable at the temperatures of operation of the recovery chamber are recovered as gases and reused or otherwise treated as desired. Further details on the practice of this invention can be had from the drawing which is a schematic diagram illustrating the practice of this invention.

In operation, hydrogen gas from supply tank A is introduced to the system at a constant pressure by means of pressure sensor L and proportional valve M through meter B. A reserve supply of boron trichloride is contained in pressurized reservoir I which is filled by distillation of boron trichloride from supply tank J. Pressure is maintained in reservoir I by means of argon gas from agon tank K. Means not shown can be povided for purging and evacuating reservoir I.

A boron trichloride vaporizing tank is shown at D. A hydrogen preheating or precooling coil is shown at C. The boron producing reactor is shown at E. The condensing coil H and the gas separator F are both contained within a constant temperature bath N.

In operation hydrogen gas is passed through coil C contained within the constant temperature bath P and into container D. The effect of constant temperature bath P is to cause a certain partial pressure of boron trichloride vapor over the boron trichloride liquid. If desired, constant temperature bath P can be dispensed with and a reliance be on the hydrogen which will then pass through a heat exchanger to bring it to the appropriate temperature for vaporizing the appropriate quantity of boron trichloride. The use of a constant temperature bath is preferred because it permits easy start up and shut down of the reaction without any lag to await the reaching of equilibrium conditions.

Tank D is supplied with boron trichloride in liquid form through line 1, initially from reservoir I, and during the course of the reaction both from separator tank F through pump G with any additional boron trichloride needed being supplied from reservoir I. Appropriate sensing devices, not shown, can be employed to maintain constant the liquid level of boron trichloride within tank D through additions from reservoir I and separator F. Hydrogen gas preheated or precooled in coil C is introduced in tank D through line 2 preferably at the bottom of the tank, passes through vapor space 3 in tank D where it mixes with boron trichloride vapor and because of the pressure and turbulence created carries boron trichloride vapor with it as it leaves tank D through outlet port 4, thereby diminishing the partial pressure of boron trichloride in vapor space 3 resulting in vaporization of more liquid boron trichloride and, upon that event, continuing the cycle of liquid replenishment, hydrogen passage and further vaporization.

The mixture of gaseous hydrogen and boron trichloride is passed through line 8 which must be held at a temperature higher than that in constant temperature bath P to prevent recondensation. The mixture passes to reactor E which is operated under conventional reaction conditions used for the reaction of boron trichloride with hydrogen to yield solid elemental boron and hydrogen chloride. Any conventional boron producing furnace such as an arc furnace can be employed under conventional conditions. Means for recovering the boron produced in the furnace are well known and do not form part of this invention. The gaseous effluent from the reaction which contains hydrogen chloride plus the inevitable excess quantities of hydrogen and boron trichloride vapor leaves the reactor through a suitable outlet port and passes through line 5 into cooling coils H and thence into separator F. Both cooling coils H and separator F are maintained in a constant temperature bath N at a temperature below the vaporization temperature of boron trichloride. The temperature of the bath should be low enough to cool the vapor to a temperature between about −75° C. and −107° C., preferably about −105° C. The bath is preferably composed of a slush of inert materials which melt above −107° C., the melting point of boron trichloride, so that the boron trichloride will condense but will still remain pumpable. Suitable materials for use in the constant temperature bath include cyclohexene, octene-1, 2-pentyne, methyl thioethane, isopropylamine, chloromethylmethylether and many other materials easily ascertainable from a standard handbook. The temperature to which the vapor mixture is cooled has a pronounced effect upon the efficiency of the recovery system. The lower the temperature, subject to being above the boron trichloride freezing point, the more efficient the separation.

Upon exposure to its reduced temperature, substantially all of the boron trichloride condenses, flowing to the bottom of separating tank F while the gases remaining, i.e. hydrogen, hydrogen chloride and any uncondensed boron trichloride, leave the system for other purposes through outlet port 6. The condensed boron trichloride is pumped through line 7 and pump G back into tank D for reuse.

It will be understood that the separation operation can be performed as a sequential operation with successive chilling steps. Also, if desired, a series of boron trichloride holding tanks can be operatively connected to the separator. A first holding tank (not shown) would be filled with boron trichloride from the separator and then a second holding tank (not shown) would then shift into its place. This procedure would insure that all of the boron trichloride flowing into vaporizing tank D would be from one tank since arrangements could be made to have the holding tanks alternate as supply sources with reservoir tank I rather than have the reservoir tank I serve as an auxiliary source to supplement the quantities delivered to the vaporizing tank directly from the separator.

Of course, it is apparent that boron trichloride from the separator F can be passed to the reservoir I where it freely mixes with fresh boron trichloride, in which case, all of the boron trichloride flowing to vaporizer tank D would come from reservoir I.

If desired, a constant temperature bath Q can also be provided to maintain constant the temperature of reservoir I and insure no premature vaporization of boron trichloride.

Further details of the practice of this invention can be had by reference to the following example which in the opinion of the inventor, illustrates the mode of carrying out the invention.

EXAMPLE

An apparatus as shown schematically in the drawing was employed for the production of boron. Hydrogen gas was metered into the system at a steady state rate of 1500 cc./mm. The volume of tank D was about 1000 cc. and was maintained with a volume of liquid boron trichloride of between 500 and 750 cc. with any necessary additions being supplied from reservoir I to maintain liquid level. Constant temperature bath P was maintained at a temperature of −10° C. with ice and saltwater. Constant temperature bath Q was maintained at a temperature of 0° C. with ice water. Constant temperature bath N was maintained at a temperature of −105° C. with a cyclohexene slush. The liquid level within separator tank F was generally maintained at a volume of 0–500 cc. in the tank which had a volume of 1000 cc.

The boron production reactor E was a coaxial tubular reactor in which the boron trichloride-hydrogen mixture was passed counter current to a moving electrically heated metallic substrate to produce a continuous filament of boron surrounding the substrate. The reaction proceeds at temperatures between about 700° C. and 1400° C., but can be carried out at higher temperatures up to about 1850° C.

To operate at 3 atm. total pressure it is only necessary to readjust pressure control L to 3 atm. and heat the constant temperature bath P to 18.5° C. To operate at 5 atm. total pressure similarly, L is adjusted to 5 atm. and constant temperature bath P regulated to 33.2° C.

Periodic analyses of the gases leaving exhaust port 6 indicated that substantially all of the excess boron trichloride was retained in the system through condensation and the yield of boron produced was found to be satisfactory and substantially constant. As a result of the automatic control, the ratio of hydrogen and boron trichloride entering the boron producing reactor remained substantially constant.

The ratio of hydrogen to boron trichloride entering the reactor is preferably established at about 1.0 to 6.0 by volume under operating conditions of the reactor. Thus the temperature of constant temperature bath P and the supply volume of hydrogen gas are easily correlated to yield the appropriate equilibrium partial pressure of boron trichloride vapor necessary for establishing the correct ratio.

Having thus described the invention that which is desired to be claimed by Letters Patent is as follows:

1. In a method of producing boron which comprises reacting boron trichloride and hydrogen in the presence of an excess of boron trichloride with respect to boron trichloride consumed and recovering excess boron trichloride for reuse, the improvement which automatically controls the quantity of boron trichloride introduced to the reaction stage and permits continuous operation comprising passing hydrogen through a zone containing boron trichloride vapor in proximity with boron trichloride liquid under conditions of temperature and velocity such that the hydrogen gas will carry with it at least a portion of the boron trichloride vapor, thereby causing vaporization of additional liquid boron trichloride.

2. A method as in claim 1 wherein the liquid boron trichloride in proximity with said zone of boron trichloride vapor is maintained at substantially constant volume by additions to compensate for vaporization.

3. A method as in claim 2 wherein the substantially constant volume of liquid boron trichloride is maintained through addition of liquid boron trichloride recycled from the reactor and by additions of fresh liquid boron trichloride.

4. A method as in claim 1 wherein the excess boron trichloride leaving the boron forming reaction is condensed and separated from gaseous hydrogen and hydrogen chloride and recycled in the liquid state to the said zone.

5. A method of producing boron comprising passing gaseous hydrogen through a combining zone containing liquid boron trichloride and gaseous boron trichloride under conditions of temperature, pressure and velocity to carry gaseous boron trichloride therewith, thereby reducing the partial pressure of boron trichloride within the zone below equilibrium conditions and resulting in the vaporization of additional boron trichloride within said zone, passing the mixture of hydrogen and gaseous boron trichloride to a reactor operating under boron forming conditions, separating boron trichloride from the reactor effluent, and recycling liquid boron trichloride to the combining zone.

6. A method as in claim 5 wherein additional boron trichloride is added as needed to maintain a substantially constant liquid volume within the combining zone.

7. A method as in claim 5 wherein separated liquid boron trichloride is combined with fresh liquid boron trichloride before being passed to the combining zone.

8. A method as in claim 5 wherein the boron trichloride is separated from the reactor effluent by cooling the gaseous reactor effluent to a temperature between about −75° C. and −107° C. to condense the boron trichloride.

9. A method as in claim 8 wherein the condensed boron trichloride is passed into a holding tank, which after substantial filling, is operatively connected as the source of boron trichloride for the combining zone.

10. A method as in claim 8 wherein the condensed boron trichloride is mixed with fresh liquid boron trichloride before being passed to the combining zone.

11. A method as in claim 8 wherein the condensed boron trichloride is passed directly to the combining zone.

References Cited

UNITED STATES PATENTS

| | | | |
|---|---|---|---|
| 1,046,043 | 12/1912 | Weintraub | 23—209 |
| 2,542,916 | 2/1951 | Fetterley | 23—209 |

OSCAR R. VERTIZ, Primary Examiner

HOKE S. MILLER, Assistant Examiner

U.S. Cl. X.R.

23—139, 277